(12) United States Patent
Sesko et al.

(10) Patent No.: US 8,179,534 B2
(45) Date of Patent: May 15, 2012

(54) FIXED WAVELENGTH ABSOLUTE DISTANCE INTERFEROMETER

(75) Inventors: David William Sesko, Woodinville, WA (US); Joseph Daniel Tobiason, Woodinville, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 115 days.

(21) Appl. No.: 12/854,784

(22) Filed: Aug. 11, 2010

(65) Prior Publication Data

US 2012/0038930 A1  Feb. 16, 2012

(51) Int. Cl.
*G01B 11/02* (2006.01)
(52) U.S. Cl. ........................................................ 356/486
(58) Field of Classification Search .......... 356/484–487, 356/496, 498
See application file for complete search history.

(56) References Cited

U.S. PATENT DOCUMENTS

| | | | |
|---|---|---|---|
| 5,270,792 A | 12/1993 | Snyder | |
| 5,371,587 A | 12/1994 | de Groot | |
| 5,446,710 A | 8/1995 | Gardner | |
| 5,521,704 A * | 5/1996 | Thiel et al. | 356/486 |
| 5,631,736 A * | 5/1997 | Thiel et al. | 356/486 |
| 5,781,295 A * | 7/1998 | Fuchs et al. | 356/486 |
| 5,784,161 A * | 7/1998 | Bechstein et al. | 356/487 |
| 6,611,379 B2 | 8/2003 | Qian | |
| 7,292,347 B2 | 11/2007 | Tobiason | |
| 7,333,214 B2 | 2/2008 | Sesko | |
| 7,433,052 B2 | 10/2008 | Tobiason | |

OTHER PUBLICATIONS

Häusler, G., et al., "Range Sensing Based on Shearing Interferometry," Applied Optics 27(22):4638-4644, Nov. 1988.

Kim, S.-W., et al., "Two-Point Diffraction Interferometer for Absolute Distance Measurement," Interferometer XII: Techniques and Analysis, Denver, Aug. 2, 2004, Proceedings of the Society of Photo-Optical Instrumentation Engineers [SPIE] 5531:162-169, Aug. 2004.
Mehta, D.S., et al., "Distance Measurement With Extended Range Using Lateral Shearing Interferometry and Fourier Transform Fringe Analysis," Optical Engineering 44(6):1-10, Jun. 2005.
Pennington, T.L., et al., "Manufacturing of a Fiber Optic Young's Double Pinhole Interferometer for Use as a 3-D Profilometer," Optics Express 6(10):196-201, May 2000.
Wyant, J.C., "Use of an AC Heterodyne Lateral Shear Interferometer With Real-Time Wavefront Correction Systems," Applied Optics 14(11):2622-2626, Nov. 1975.
Santos, G., et al., "Distance Measurement With Adjustable Range by Interferometry With Gaussian Beams," Optical Engineering 44(10):1-6, Oct. 2005.
European Search Report mailed Nov. 10, 2011, in corresponding Application No. EP 11177104, filed Aug. 10, 2011, 7 pages.

* cited by examiner

*Primary Examiner* — Michael A Lyons
(74) *Attorney, Agent, or Firm* — Christensen O'Connor Johnson Kindness PLLC (57) ABSTRACT

A fixed wavelength absolute distance interferometer including a first interferometer comprising a first light source transmitting a first light beam having a wavelength W toward a measurement target, a wavefront radius detector configured to provide a first measurement responsive to the wavefront radius at the wavefront radius detector, and a first path length calculating portion calculating a coarse resolution absolute path length measurement R; and a second interferometer comprising a beam transmitting device transmitting a second-interferometer light beam having a wavelength $\Lambda$, a beam splitting/combining device separating the second-interferometer light beam into reference and measurement beams and combining the returning reference and measurement beams into a combined beam, a second-interferometer detector configured to receive the combined beam and provide signals of a phase $\phi$ of the combined beam, and a second path length calculating portion configured to determine a medium resolution absolute path length measurement $Z_M$.

20 Claims, 7 Drawing Sheets

200
FIXED WAVELENGTH ABSOLUTE DISTANCE INTERFEROMETER

BACKGROUND

This invention relates to a fixed wavelength absolute distance interferometer. A two laser frequency chirped absolute distance interferometer (ADI) was developed so as to eliminate or reduce errors or ambiguity included in measurement results measured by a conventional (e.g., Michelson, Twyman-Green, or Mach-Zehnder type) laser interferometer (U.S. Pat. No. 7,292,347).

To find an absolute distance of a sample surface with high resolution, a coarse-medium-fine measurement scheme is carried out in the ADI, where the coarse measurement is used to remove the $2\pi$ phase ambiguity from the medium measurement, which is in turn used to remove the $2\pi$ ambiguity from the fine measurement.

The above ADI was capable of sub-wavelength interpolation, with nanometer resolution, over a potential absolute range of 1 m or greater.

SUMMARY

However, the above ADI suffered from disadvantages in some applications, for example:

1. A $\Delta\lambda=1$ nm frequency chirp was used, and to accommodate a limited detector bandwidth, a modulation frequency of 100 Hz was used to obtain a coarse distance measurement. As a result, the measurement sample rate was limited to a relatively low value (<100 Hz).

2. The ADI system includes an external cavity laser to provide the frequency chirp and a reference interferometer is employed to calibrate the wavelength chirp. This adds cost and complexity to the system.

Other known ADIs use additional fixed wavelengths, rather than a chirped wavelength, in a conventional type interferometer configuration (e.g., Michelson or Mach-Zehnder type), in order to provide a useful absolute measuring range. However, such ADIs typically require additional laser sources, switching means, calibration means, and the like. Therefore, the cost and complexity of such systems is also unsuitable for some applications.

The object of the present invention is to provide a fixed wavelength absolute distance interferometer having a simple constitution and being able to eliminate the wavelength ambiguity included in measurement results from non-ADIs, to economically provide accurate absolute distance measurements over a relatively long measurement range.

A first aspect of the present invention relates to a fixed wavelength absolute distance interferometer including: a first interferometer comprising: a first light source comprising at least a first point source that transmits at least a first light beam having a wavelength W along a first-interferometer measurement optical path toward a measurement target, wherein the first-interferometer measurement optical path includes a variable optical path length portion having a length that varies with a position of the measurement target, and the at least a first light beam has a wavefront radius that varies with distance along the first-interferometer measurement optical path; and a wavefront radius detector configured to provide a first measurement responsive to the wavefront radius at the wavefront radius detector, wherein the first measurement is indicative of the first-interferometer measurement optical path length; and a first path length calculating portion configured to calculate a coarse resolution absolute path length measurement R of the first-interferometer measurement optical path length on the basis of the first measurement; and a second interferometer comprising: a beam transmitting device transmitting a second-interferometer light beam that provides a synthetic measurement wavelength $\Lambda$; a beam splitting/combining device separating the second-interferometer light beam into a reference beam traversing a fixed optical path and a measurement beam traversing a second-interferometer measurement optical path that includes the variable optical path length portion having the length that varies with a position of the measurement target, and providing a combined beam by combining the reference beam returning from the fixed optical path with the measurement beam reflected from the measurement target and returning along the second-interferometer measurement optical path; a second-interferometer detector configured to receive the combined beam and provide signals indicative of a phase $\phi$ associated with the synthetic measurement wavelength $\Lambda$ in the combined beam; and a second path length calculating portion configured to determine a medium resolution absolute path length measurement $Z_M$ of the second-interferometer measurement optical path length on the basis of a number of wavelengths $N_\Lambda$, the wavelength $\Lambda$, and the phase $\phi$ of the combined beam indicated by the signals of the second-interferometer detector, wherein: the number of wavelengths $N_\Lambda$ is a calculated integer number of complete wavelengths $\Lambda$ included in the second-interferometer measurement optical path length; and the number of wavelengths $N_\Lambda$ is calculated based on the coarse resolution absolute path length measurement R and an offset constant that is related to a constant difference $C_{12}$ between the first-interferometer measurement optical path length and the second-interferometer measurement optical path length.

DESCRIPTION OF THE DRAWINGS

Exemplary embodiments of the present invention will be described in detail based on the following figures, wherein.

DETAILED DESCRIPTION

1. First Exemplary Embodiment

A fixed wavelength absolute distance interferometer 1 of a first exemplary embodiment is described below.

Figure 1:
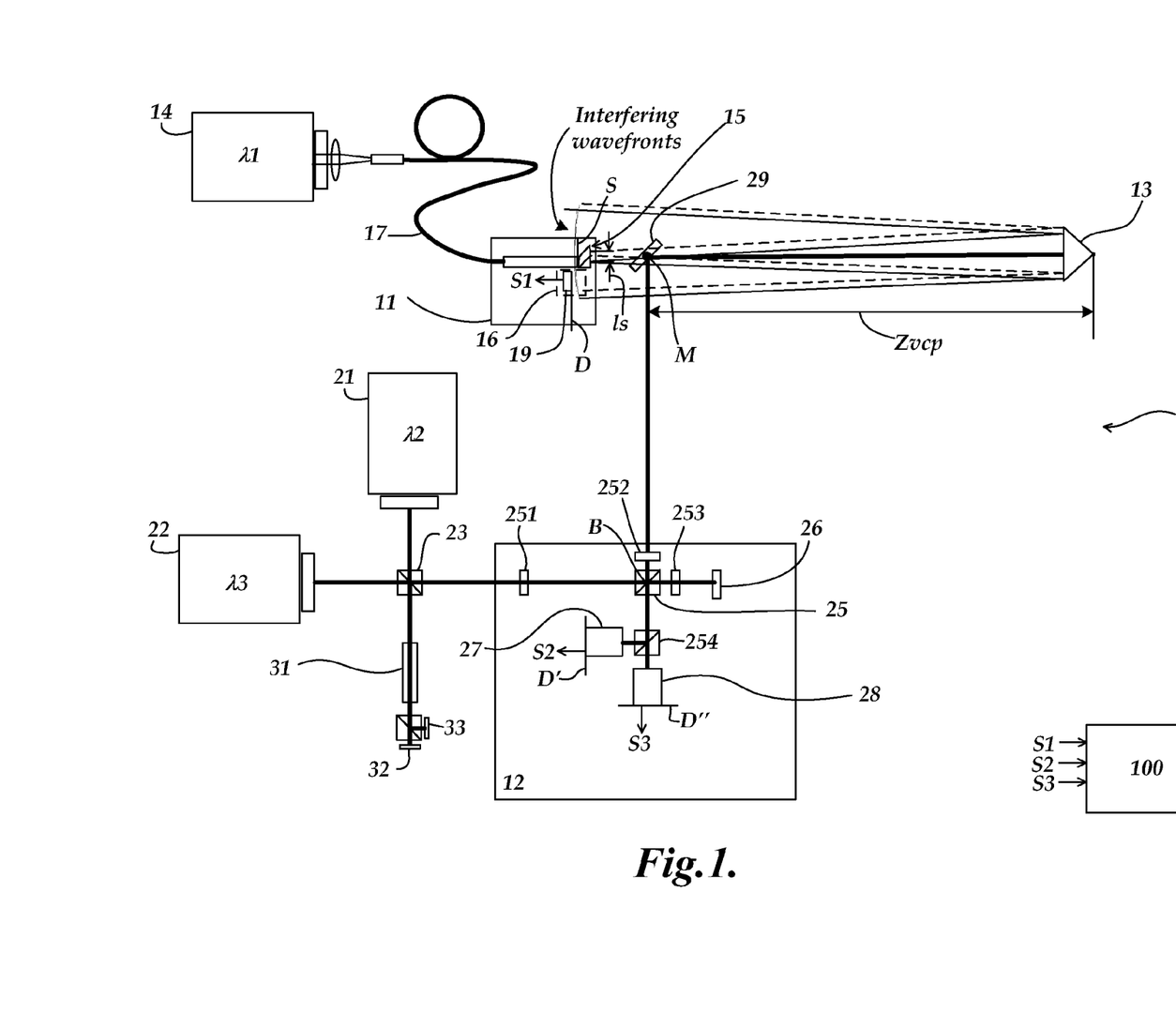
FIG. 1 is a schematic diagram showing a configuration of a fixed wavelength absolute distance interferometer of a first exemplary embodiment.

As shown in FIG. 1, the fixed wavelength absolute distance interferometer 1 includes a first interferometer 11 for a coarse resolution absolute optical path length measurement R of a measurement optical path (first-interferometer measurement optical path) and a second interferometer 12 for measurement of a medium resolution absolute optical path length measurement $Z_M$ of a measurement optical path and a fine resolution absolute optical path length measurement $Z_F$.

The first interferometer 11 comprises a first laser emitter 14 emitting a laser beam having a wavelength λ1 (W=λ1), a beam splitting device 15 splitting the laser beam emitted from the first laser emitter 14 approximately at the point source location S into two laser beams (a first light beam and a second light beam) and emitting the two laser beams (a first-interferometer light beam) through a first-interferometer measurement optical path toward a retroreflector 13 (a measurement target), and an imaging array 19 that is a detector array detecting interference fringes formed by the first and the second light beams. The first laser emitter 14 and the beam splitting device 15 operate to provide the first light source and function as a dual point light source. The imaging array 19 operates to provide a wavefront radius detector 16. The first laser emitter 14 and the beam splitting device 15 are connected by an optical fiber 17, which may output the source light at a fiber end or aperture at the point source location S.

The imaging array 19 is connected to output signal(s) S1 to a computer 100 (connections not shown). The computer inputs the signal(s) S1 and calculates a wavefront radius and/or a coarse resolution absolute length measurement R from some design constants and a pitch P of the interference fringes detected by the imaging array 19 (e.g., according to Equation (1), described below), and accordingly, corresponds to a first path length calculating portion. As described further below, the wavefront radius and/or the coarse resolution absolute length measurement R includes a variable common path length portion $Z_{VCP}$ defined between a minor location M of the dichroic mirror 29 and the retroreflector 13, and a first interferometer constant path portion $C_1$, which includes path length contributions from a path portion SM defined approximately from the point source location S to the mirror location M, and a path portion MD defined from the minor location M to the detector location D, for example.

The second interferometer 12 comprises a second laser emitter 21 corresponding to a second light source and emitting a λ2 light beam that is a laser beam having a wavelength of λ2, a third laser emitter 22 corresponding to a third light source and emitting a λ3 light beam that is a laser beam having a wavelength of λ3, a beam combining device 23 combining and polarizing the λ2 light beam and the λ3 light beam into a second-interferometer light beam that provides a synthetic wave having a synthetic wavelength Λ (Λ=λ2*λ3/|λ3−λ2|), a half wavelength plate 251 disposed on the optical path of the second-interferometer light beam entering into the beam-splitting/combining device 25 to provide a desirable polarization rotation prior to separation of orthogonally polarized reference beam and measurement beam components at a beam-splitting/combining device 25 that is disposed on the optical path of the second-interferometer light beam transmitted from the beam combining device 23 for splitting the second-interferometer light beam into a reference beam traveling through a fixed length optical path toward a reference mirror 26 and a measurement beam traveling through a second-interferometer optical path having an optical path length varying in accordance with the position of the retroreflector 13 (measurement target) and partly overlapping with the first-interferometer measurement optical path along the variable common path length portion $Z_{VCP}$, and combining the reference beam reflected by the reference minor 26 and returning through the fixed optical path with the measurement beam reflected by the retroreflector 13 and returning through the second-interferometer measurement optical path into a combined beam, a λ2 detector 27 detecting a λ2 signal component of the combined beam and a λ3 detector 28 detecting a λ3 signal component of the combined beam.

The signal(s) S2 from the λ2 detector 27 and the signal(s) S3 from λ3 detector 28 are also connected to the computer 100 (connections not shown). The computer 100 inputs the signals S2 and S3 and calculates a medium resolution absolute length measurement $Z_M$ and a fine resolution absolute length measurement $Z_F$ from a phase of the λ2 signal component of the combined beam detected by the λ2 detector 27 and from a phase of the λ3 signal component of the combined beam detected by the λ3 detector 28, and thus, also corresponds to a second path length calculating portion. As described further below, the medium resolution absolute length measurement $Z_M$ and the fine resolution absolute length measurement $Z_F$ include the variable common path length portion $Z_{VCP}$ between the minor location M and the retroreflector 13, and a second interferometer constant path portion $C_2$, which includes a path length contributions from a path portion BM defined approximately from the mirror location M to the splitting/combining location B of the beam-splitting/combining device 25, and a path portion BD approximately from the splitting/combining location B to the detector location D' (or D"), for example.

Figure 6:
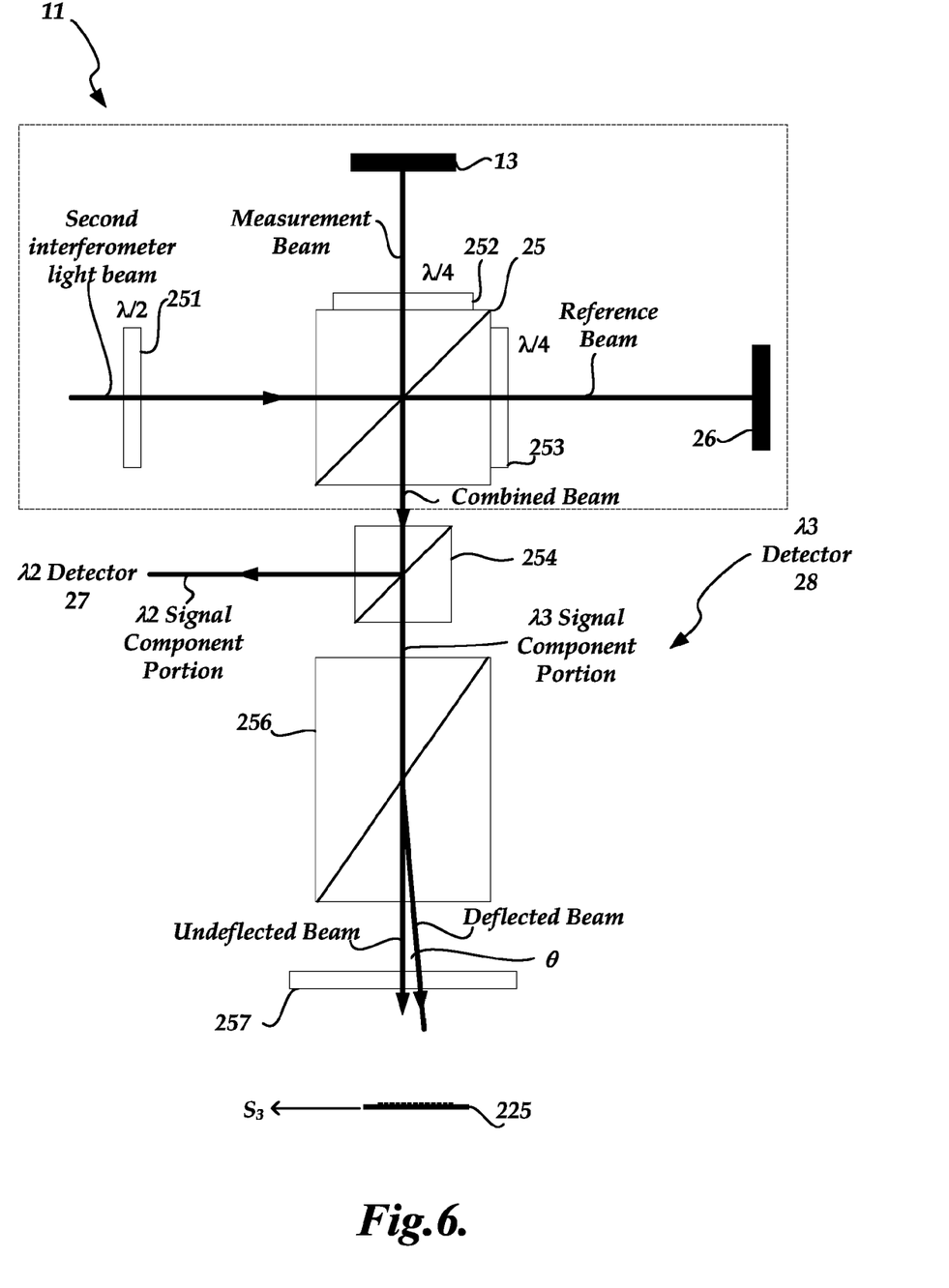
FIG. 6 is a schematic diagram showing a configuration for a $\lambda 2$ detector and a $\lambda 3$ detector in the fixed wavelength absolute distance interferometer of the first to third exemplary embodiments.
Figure 7:
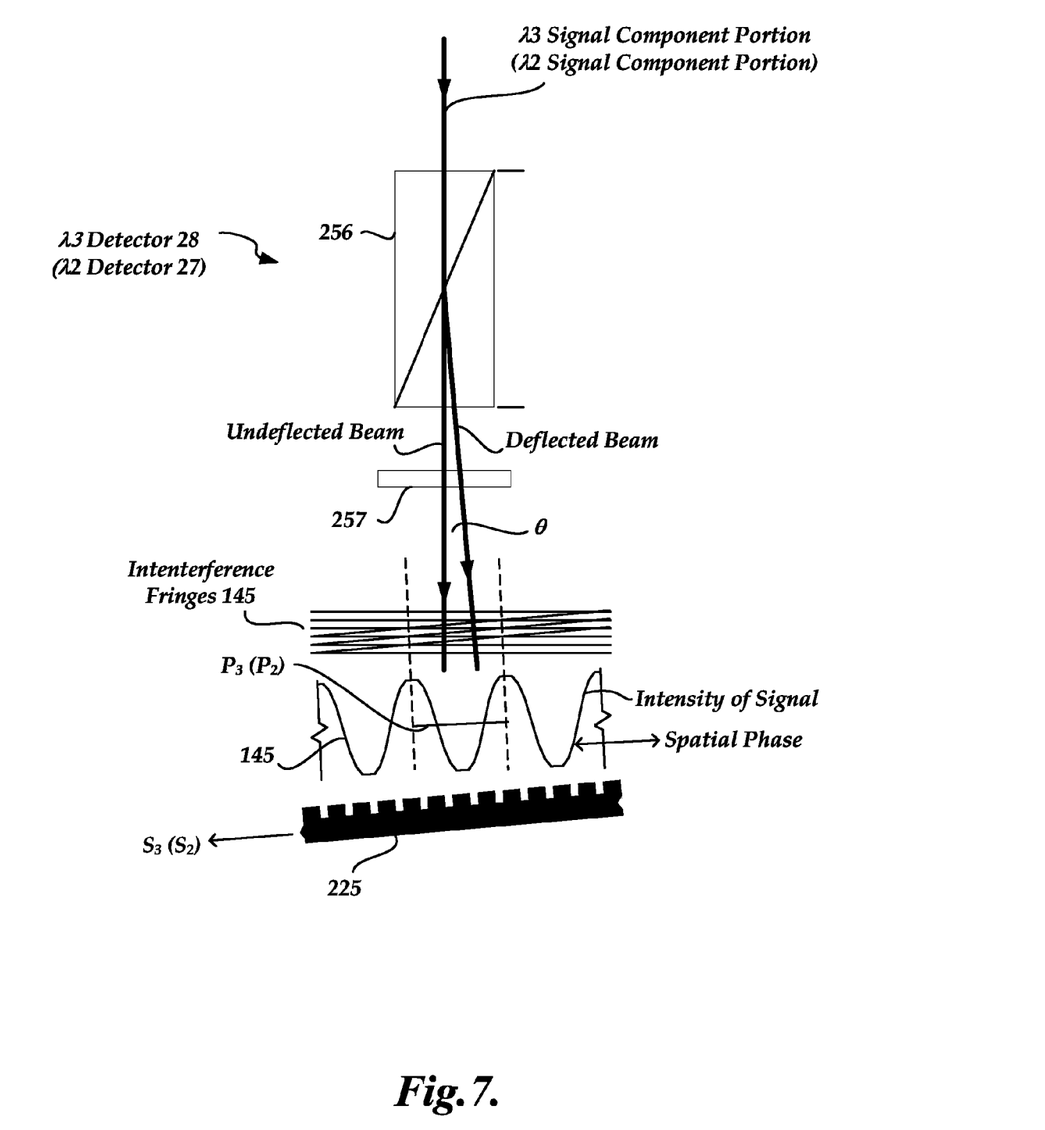
FIG. 7 is a diagram showing the operation of the $\lambda 2$ and $\lambda 3$ detectors shown in FIG. 6.

The configuration of the second interferometer 12 around the beam-splitting/combining device 25, the reference mirror 26, the λ2 detector 27, and the λ3 detector 28, and especially the configuration of one embodiment of the λ2 detector 27 and the λ3 detector 28, is shown in detail in FIGS. 6 and 7. In various embodiments, the λ2 detector 27 may have the same configuration as that of the λ3 detector 28, although it will be understood that in alternative embodiments other known quadrature signal detection methods may be used for either detector.

As shown in FIGS. 1 and 6, a half wavelength plate 251 is disposed on the optical path of the second-interferometer light beam entering into the beam-splitting/combining device 25, to provide separable reference beam and measurement beam components. On a measurement beam-exiting face and a reference beam-exiting face of the beam-splitting/combining device 25, quarter wavelength plates 252 and 253 are provided, respectively, to provide for proper transmission and reflection of beams as they return to the beam-splitting/combining device 25. Through the measurement beam-exiting face of the beam-splitting/combining device 25, the measurement beam exits into the second-interferometer measurement optical path, while through the reference beam exiting face of the beam-splitting/combining device 25, the reference beam exits toward the reference mirror 26.

On the optical path of the combined beam output by the beam-splitting/combining device 25, a beam splitting device 254 splits the combined beam from the beam-splitting/combining device 25 into the λ2 signal component portion and the λ3 signal component portion (e.g., by including a wavelength filtering interface to direct the λ2 wavelength to the λ2 detector 27 and the λ3 wavelength to the λ3 detector 28).

In the embodiment shown in FIGS. 6 and 7, the λ3 detector 28 includes a polarization-sensitive beam deflecting element (PSBDE) 256 separating the λ3 signal component portion into an undeflected beam and a deflected beam deflected by a divergence angle θ, a mixing polarizer 257 oriented halfway between the polarization angles of the deflected and undeflected beams, and a photodetector array 225 detecting interference fringes generated by the resulting interference between the undeflected beam and the deflected beam. The PSBDE 256 has the configuration of the PSBDE described in U.S. Pat. No. 7,333,214, the disclosure of which is incorporated herein by reference in its entirety. The '214 patent discloses an interferometer analogous to the second interferometer 12, and discloses a method for using a PSBDE to input a orthogonally polarized reference and object (measurement) beams, such as those present in the $\lambda 3$ (or $\lambda 2$) signal component portion, and produce interference fringes 145 that have a variable position (spatial phase) related to the phase difference between the reference and object (measurement) beams, and for using a photodetector array to indicate the variable spatial phase of the fringes 145, and for calculating a phase difference between the orthogonally polarized reference and measurement beams based on the indicated spatial phase. Changes in that phase difference are indicative of changes in the path length of the measurement beam, according to known principles of interferometry.

The photodetector array 225 is connected with the computer and the computer calculates the phase φ2 of the $\lambda 2$ signal component (and the phase φ3 of the $\lambda 3$ signal component) from the position (the spatial phase) of the interference fringes on the photodetector array 225 in accordance with the procedure described in U.S. Pat. No. 7,333,214.

In some embodiments, in order for the beams of the first and second interferometers to be aligned along the variable common path length portion $Z_{VCP}$ without introducing crosstalk between them, the dichroic mirror 29 is disposed along the second-interferometer measurement optical path and on the first-interferometer measurement optical path, and operates to pass through a light beam having a wavelength $\lambda 1$ while reflecting a light beam having a wavelength different than $\lambda 1$.

A rubidium cell 31 (or other reference) may provide a calibration reference to ensure the stability of wavelengths $\lambda 2$ and $\lambda 3$, which may correspond to absorption wavelengths of the rubidium cell 31. The rubidium cell 31 may receive a portion of the second-interferometer light beam output at the beam combining device 23. A $\lambda 2$ absorption detector 32 may detect a $\lambda 2$ portion in the second-interferometer light beam passing through the rubidium cell 31, and a $\lambda 3$ absorption detector 33 may detect a $\lambda 3$ portion in the second-interferometer light beam passing through the rubidium cell 31. The absorption detectors 32 and 33 may be configured according to known methods to sense a drop in the power of the $\lambda 2$ portion and the $\lambda 3$ portion of the second-interferometer light beam passing through the rubidium cell 31 when the second laser emitter 21 and the third laser emitter 22 are tuned to the proper wavelengths $\lambda 2$ and $\lambda 3$, respectively, and may output appropriate control signals to control the laser emitters to achieve this result.

The operation of the fixed wavelength absolute distance interferometer 1 is described below.

In the first interferometer 11, coarse resolution measurement of the measurement optical path length is carried out by the following procedure. First, the first laser emitter 14 emits a laser beam having a wavelength $\lambda 1$ (e.g., 633 nm). Then, the laser beam emitted from the first laser emitter 14 is focused into an optical fiber 17 and transmitted through the optical fiber 17 and emitted as a point source at the end of the optical fiber 17 into the beam splitting device 15. The beam splitting device 15 splits the laser beam into two laser beams, which appear to come from two point sources. The two laser beams have the wavelength of $\lambda 1$, and thus, pass through the dichroic filter 29 and are transmitted toward the retroreflector 13, which provides a movable measurement target. Since the two laser beams reflected from the retroreflector 13 are in proximity to each other, they interfere with each other to generate interference fringes.

The imaging array 19 detects the interference fringes formed by the two beams, and thus provides a wavefront radius detector 16, as follows. The computer calculates the pitch P of the interference fringes detected by the imaging array 19, and then, obtains the coarse resolution absolute optical path length measurement R, which is substantially the same as the wavefront radius, by the following equation (1):

$$R=(c*ls*P)/\lambda 1 \quad (1)$$

wherein P is the pitch of (or distance between) the interference fringe maxima, c is a geometrical factor that depends on the alignment of the two point sources relative to a detection plane of the interference fringe pattern, and ls is a distance between the two point sources at the beam splitting device 15. The coarse resolution absolute length measurement R corresponds to the previously outlined variable common path measurement distance $Z_{VCP}$ and the first interferometer constant path portion $C_1$ according to the equation (2):

$$R=(2*Z_{VCP})+C_1 \quad (2)$$

In the second interferometer 12, the medium resolution absolute optical path length measurement $Z_M$ and the fine resolution absolute optical path length measurement $Z_F$ are carried out by the following steps. The $\lambda 2$ light beam emitted from the second laser emitter 21 and having a wavelength $\lambda 2$ (e.g., 780 nm) and the $\lambda 3$ light beam emitted from the third laser emitter 22 and having a wavelength $\lambda 3$ (e.g., 795 nm) are input into the beam combining device 23. At the beam combining device 23, the $\lambda 2$ light beam is combined with the $\lambda 3$ light beam to generate the second-interferometer light beam that includes the two wavelengths and provides a synthetic wavelength $\Lambda$:

$$\Lambda=\lambda 2*\lambda 3/|\lambda 3-\lambda 2| \quad (3)$$

Approximately the whole portion of the second-interferometer light beam is transmitted from the beam combining device 23 through the half wavelength plate 251 into the beam splitting/combining device 25 to be split into the measurement beam and the reference beam. The half wavelength plate 251 rotates the polarization of the second-interferometer light beam such that the beam splitting/combining device 25 provides orthogonally polarized measurement and reference beams that have similar intensities.

A portion of the second-interferometer light beam from the beam combining device 23 is transmitted through the rubidium cell 31 and is monitored by the $\lambda 2$ detector 32 and the $\lambda 3$ detector 33, as outlined above.

The measurement beam is input to the polarized beam-splitting/combining device 25 and is transmitted through the second-interferometer measurement optical path to the retroreflector 13. Along the second-interferometer measurement optical path, the measurement beam passes through a quarter wave plate 252 and is reflected by the dichroic filter 29. The measurement beam reflected by the retroreflector 13 returns through the second-interferometer measurement optical path to the quarter wave plate 252 and the beam splitting/combining device 25. The polarization of the measurement beam is modified by the quarter wave plate 252 and its reflections along the second-interferometer measurement optical path such that it passes through the polarized beam-splitting/combining device 25 on its return.

Concurrently, the reference beam passes through the polarized beam-splitting/combining device 25, a quarter wave plate 253, and the reference path having a fixed length, is reflected by the reference mirror 26, and returns to the beam splitting/combining device 25 with polarization such that it is reflected.

The measurement beam and the reference beam returning to the beam splitting/combining device 25 are combined at the beam splitting/combining device 25 into the combined beam and transmitted into the beam splitting device 254. At the beam splitting device 254, the combined beam is separated into the λ2 signal component portion and the λ3 signal component portion (e.g., by a wavelength filtering interface in the beam splitting device 254).

The λ2 signal component portion is input to the λ2 detector 27 which provides one or more signal(s) S2 that are indicative of the phase difference or "phase" φ2 between the λ2 signal component portions in the orthogonally polarized reference and measurement beams that are present in the combined beam. Changes in that phase difference are indicative of changes in the path length of the measurement beam, according to known principles of interferometry. Similarly, the λ3 signal component portion is input to the λ3 detector 28 which provides one or more signal(s) S3 that are indicative of the phase difference or "phase" φ3 between the λ3 signal component portions in the orthogonally polarized reference and measurement beams that are present in the combined beam. Changes in that phase difference are also indicative of changes in the path length of the measurement beam, according to known principles of interferometry. In one embodiment, the λ2 detector 27, and the λ3 detector 28 may be configured as described with reference to FIGS. 6 and 7. In various embodiments, the λ2 detector 27 may have the same configuration as that of the λ3 detector 28, although it will be understood that in alternative embodiments, other known quadrature detection methods used in interferometers may be used for either detector.

The computer 100 may input the signal(s) S2 and S3 and calculate the synthetic wavelength phase φ of the second-interferometer light beam from the calculated phases φ2 and φ3 by the following equation (4):

$$\phi = \phi 3 - \phi 2 \quad (4)$$

Then, the medium resolution absolute optical path length measurement $Z_M$ is related to the phase φ by the following equation (5):

$$Z_M = \Lambda[(|\phi|)_{mod 2\pi}/2\pi] + N_\Lambda * \Lambda \quad (5)$$

wherein $N_\Lambda$ is a number of whole synthetic wavelengths (having a wavelength Λ) in the second-interferometer measurement optical path.

Furthermore, $Z_M$ relates to the previously outlined variable common path measurement distance $Z_{VCP}$ and the second interferometer constant path portion $C_2$ according to the equation (6):

$$Z_M = (2 * Z_{VCP}) + C_2 \quad (6)$$

According to equations (6) and (2):

$$Z_M = R - C_1 + C_2 \quad (7)$$

We may define a quantity $C_{12} = (C_1 - C_2)$, which may be regarded as a constant path length difference between the measurement optical paths of the first and second interferometers. $C_{12}$ may be known by design or test. According to equations (5) and (7):

$$N_\Lambda = \text{integer part of } |R - C_{12}|/\Lambda \quad (7)$$

Since R may be measured absolutely by the first interferometer 11, as outlined above, $N_\Lambda$ may be determined based on that measurement and $Z_M$ may be determined with improved accuracy relative to R based on the combination of measurements and equations (7), (4), and (5).

When the retroreflector 13 moves relative to the imaging array 19 (the wavelength radius detector 16), as shown in the figures, the number of the waves $N_\Lambda$ is calculated as outlined above. However, it is also possible to have an embodiment where the wavelength radius detector 16 is mounted on the same element as the retroreflector, such that the first interferometer measurement optical path length traverses the common path length portion $Z_{VCP}$ only once to reach the wavelength radius detector 16, and:

$$R = Z_{VCP} + C'_1 \quad (8)$$

wherein $C'_1$ is a constant path length portion associated with such a first interferometer measurement optical path length.

When the retroreflector 13 is fixed relative to the wavefront radius detector 16, the number of the waves $N_\Lambda$ is then calculated by the following equation:

$$N_\Lambda = \text{integer part of } |2R - C'_{12}|/\Lambda \quad (9)$$

(wherein $C'_{12}$ is a constant difference between such a first-interferometer measurement optical path length and the second-interferometer measurement optical path length, e.g., $C'_{12} = 2C'_1 - C_2$).

Further, based on the medium resolution absolute optical path length measurement $Z_M$ obtained by the above procedure, the computer calculates a number of wavelengths $N_{\lambda i}$ that is a number of wavelengths λi of the λi light beam (i=2 or 3) in the medium resolution absolute path length measurement $Z_M$ and that is an integral part of a quotient obtained by dividing the medium resolution absolute path length measurement $Z_M$ by the wavelength λi, and then calculates a fine resolution absolute path length measurement $Z_F$ on the basis of the obtained number of wavelengths $N_{\lambda i}$ and the phase φi of the λi light beam detected by the λi detector by the following equation (10):

$$Z_F = \lambda i(|\phi i|_{mod 2\pi}/2\pi) + \lambda i * N_{\lambda i} + Ci_{FM} i = 2 \text{ or } 3 \quad (10)$$

wherein $Ci_{FM}$ is a difference between the path length measured by the measurement $Z_F$ and the path length measured by the measurement $Z_M$, and is constant regardless of the position of the retroreflector 13 (the measurement target).

Figure 5:
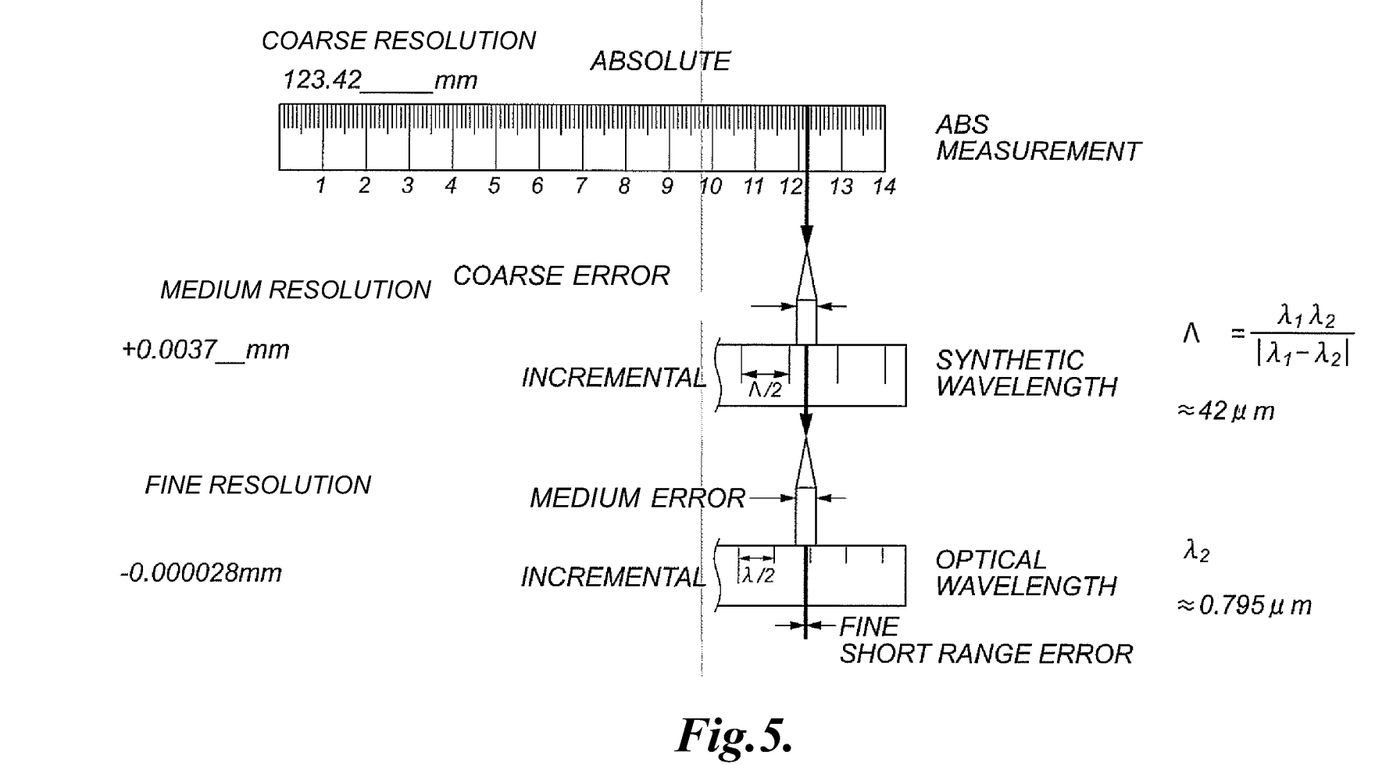
FIG. 5 is a diagram showing the principle of coarse-medium-fine measurements used in the fixed wavelength absolute distance interferometers of the first to third exemplary embodiments.

The relationship between the coarse resolution measurement R, the medium resolution measurement $Z_M$, and the fine resolution measurement $Z_F$ is shown in FIG. 5. Presuming that the wavelengths λ1, λ2, and λ3 are 633 nm, 780 nm, and 795 nm, respectively, and the coarse resolution measurement R=123.42 mm.

As shown in FIG. 5, the coarse resolution measurement includes a coarse error, which is less than the synthetic wavelength and may be on the order of 10 microns for the type of first interferometer disclosed herein, for example. Thus, the coarse resolution measurement provides a reliable basis for determining $N_\Lambda$, and calculation of the medium resolution measurement $Z_M$ is carried out on the basis of $N_\Lambda$, the synthetic wavelength of the second-interferometer light beam Λ, 42 μm (=λ2*λ3/|λ3−λ2|), and the phase φ thereof (=φ3−φ2). The error in measurement of the phase φ may be less than the wavelengths λ2 or λ3 so as to provide a medium range error that is significantly smaller than the coarse error, and sufficient to reliably determine $N_{\lambda i}$. In the illustrated example, the medium resolution measurement $Z_M$ is larger than the coarse resolution measurement R by 0.0037 mm. That is, the medium resolution measurement $Z_M$ is 123.4237 mm.

Calculation of the fine resolution measurement $M_F$ is performed on the basis of the wavelength λ2 or λ3 and the phase φ2 or φ3 so as to reduce the medium range error. In the illustrated example, when the fine resolution measurement $M_F$ is calculated on the basis of $N_{\lambda 3}$, the wavelength λ3 (=795 nm), and the phase φ3, the fine resolution measurement $M_F$ is smaller than the medium resolution measurement $Z_M$ by 0.000028 mm, that is, the fine resolution measurement $M_F$ is 123.423672 mm (123.4237 mm−0.000028 mm).

The configuration of first interferometer 11 has been determined such that it has a range to resolution ratio (or range to accuracy ratio) that is ideal in combination with the dual fixed wavelength second interferometer 12. The ideal nature of this combination has not been previously recognized or employed in the manner disclosed herein. In the fixed wavelength absolute distance interferometer of the first exemplary embodiment, a fixed wavelength laser can be used as the first, second, and third laser emitters. Accordingly, usage of an external cavity laser can be eliminated, and additionally, the first interferometer 11 and the second interferometer 12 are less susceptible to vibration and drift errors and have improved reliability.

Further, no chirp at a specific modulation frequency (e.g., 100 Hz) is employed in the first interferometer 11 to obtain the coarse resolution measurement R. Thus, the data bandwidth is not limited to a relatively low value (<100 Hz).

In addition, both the first interferometer 11 and the second interferometer 12 have a much simpler configuration than that of the ADI of U.S. Pat. No. 7,292,347.

In place of the beam splitting device 15, a dual point light source configured by a first optical fiber, from one end of which the laser beam from the first laser emitter 14 is introduced and which configures a first point source, and a second optical fiber, from one end of which the laser beam from the first laser emitter 14 is introduced and which configures a second point source located in the proximity of the first point source, can be employed. The second optical fiber can branch from the first optical fiber. The dual point light source also can be configured by two laser emitters located proximate to each other and emitting laser beams toward the retroreflector 13.

2. Second Exemplary Embodiment

A fixed wavelength absolute distance interferometer 2 of a second exemplary embodiment is described below.

Figure 2:
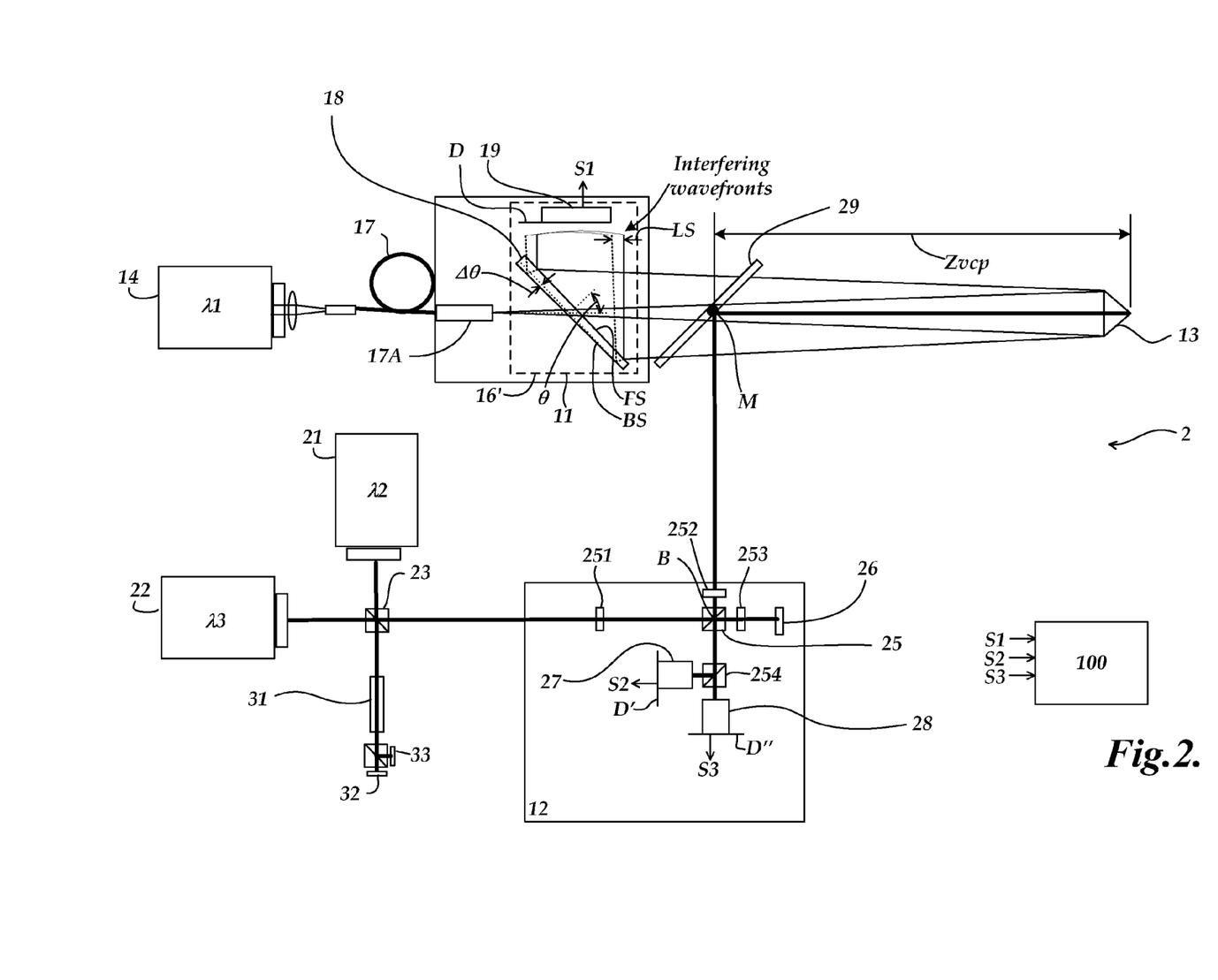
FIG. 2 is a schematic diagram showing a configuration of a fixed wavelength absolute distance interferometer of a second exemplary embodiment.

As shown in FIG. 2, the fixed wavelength absolute distance interferometer 2 includes a first interferometer 11 and a second interferometer 12. The second interferometer 12 has the same configuration as that of the second interferometer 12 of the fixed wavelength absolute distance interferometer 1 of the first exemplary embodiment.

The configuration of the first interferometer 11 is described below. In the embodiment of the first interferometer 11 shown in FIG. 2, the wavefront radius detector 16' comprises a wedge element 18 and uses a known type of lateral shearing wavefront radius detection, and the beam splitting device 15 may be omitted. The wedge element 18 is a wedge shaped plate formed of a transparent material and is disposed so that a front surface FS that the laser beam emitted from the first laser emitter 14 meets is slanted at an angle of incidence θ, e.g., 45 degrees. A back surface BS of the wedge element 18 is arranged at a wedge angle Δθ with respect to the front surface FS.

The laser beam emitted from the first laser emitter 14 is transmitted through the optical fiber 17 and transmitted toward the retroreflector 13 from a point source aperture 17A at the end of the optical fiber 17.

The returning first-interferometer light beam strikes the wedge element 18 and generates two wavefronts reflected by its front surface FS and its back surface BS, respectively, such that they can interfere and form interference fringes. The wavefront radius detector 16' is positioned and configured such that it receives the formed interference fringes, which are detected by the imaging array 19.

Except for the configuration differences described above, the first interferometer 11 of the fixed wavelength absolute distance interferometer 2 has the same configurations as those of the first interferometer of the fixed wavelength absolute distance interferometer of the first exemplary embodiment.

The function of the fixed wavelength absolute distance interferometer 2 is described below.

In the first interferometer 11, since the point source aperture 17A is a single point source, a laser beam emitted by the first laser emitter 14 is emitted from the point source aperture 17A as a laser beam having a single spherical wavefront and a wavelength λ1.

The single wavefront laser beam bypasses the wedge element 18 and traverses through the dichroic filter 29 toward the retroreflector 13 along the first-interferometer measurement path and is reflected back by the retroreflector 13. The single wavefront of the returning laser beam is split into two approximately identical wavefronts having approximately identical radii of curvature at the wedge element 18, and then, the two-wavefronts are reflected by the wedge element 18 toward the imaging array 19. The interference fringes formed by the two wavefronts are detected by the imaging array 19. The two wavefronts are separated by a shearing distance or offset LS along a shearing plane direction due to the thickness of the wedge element 18 and the wedge angle Δθ. The value of LS is a constant that may be determined by design or experiment. As is generally known for such wedge plates, the fringes generated by a spherical wavefront are rotated at an angle γ with respect to the shearing plane (or with respect to the angle associated with plane wavefronts) due to the operation of wedge plate 18. The computer calculates the pitch and angle of the interference fringes detected by the imaging array 19. The coarse resolution measurement R (which is the wavefront radius R) is obtained by the computer connected with the imaging array 19 on the basis of the pitch P of the interference fringes, and the angle γ of the interference fringes as detected by the imaging array 19 according to the equation:

$$R = LS * P/(\lambda 1 * \sin \gamma) \quad (11)$$

In some embodiments, the pitch P and the angle γ may be determined by the computer using fourier analysis techniques. In some embodiments, the configuration of the wedge plate element and related detection may be approximately as described in the article "Distance Measurement with Extended Range using Lateral Shearing Interferometry and Fourier Transform Fringe Analysis", by Mehta et al., in *Optical Engineering*, June 2005, for example. As described in that article, it is also possible to configure a wavefront radius detector using a plate with parallel surfaces, rather than a wedge angle. Therefore, the wedge plate configuration outlined above is exemplary only, and not limiting.

The second interferometer 12 functions, and calculation of the medium resolution measurement $Z_M$ and the fine resolution measurement $Z_F$ is carried out in the same manner as described in the first exemplary embodiment.

As described above, the single wavefront of the laser beam transmitted from the point source aperture 17A is not separated into two wavefronts but travels through the entire first-interferometer measurement path before the second wavefront is generated. Thus, the resulting interference fringes are less distorted, and accordingly, the first interferometer 11 has improved robustness and accuracy even under conditions where turbulence is less strictly controlled, in comparison to a fixed wavelength absolute distance interferometer having a first interferometer that comprises a dual point light source.

3. Third Exemplary Embodiment

A fixed wavelength absolute distance interferometer 3 of a third exemplary embodiment is described below.

Figure 3:
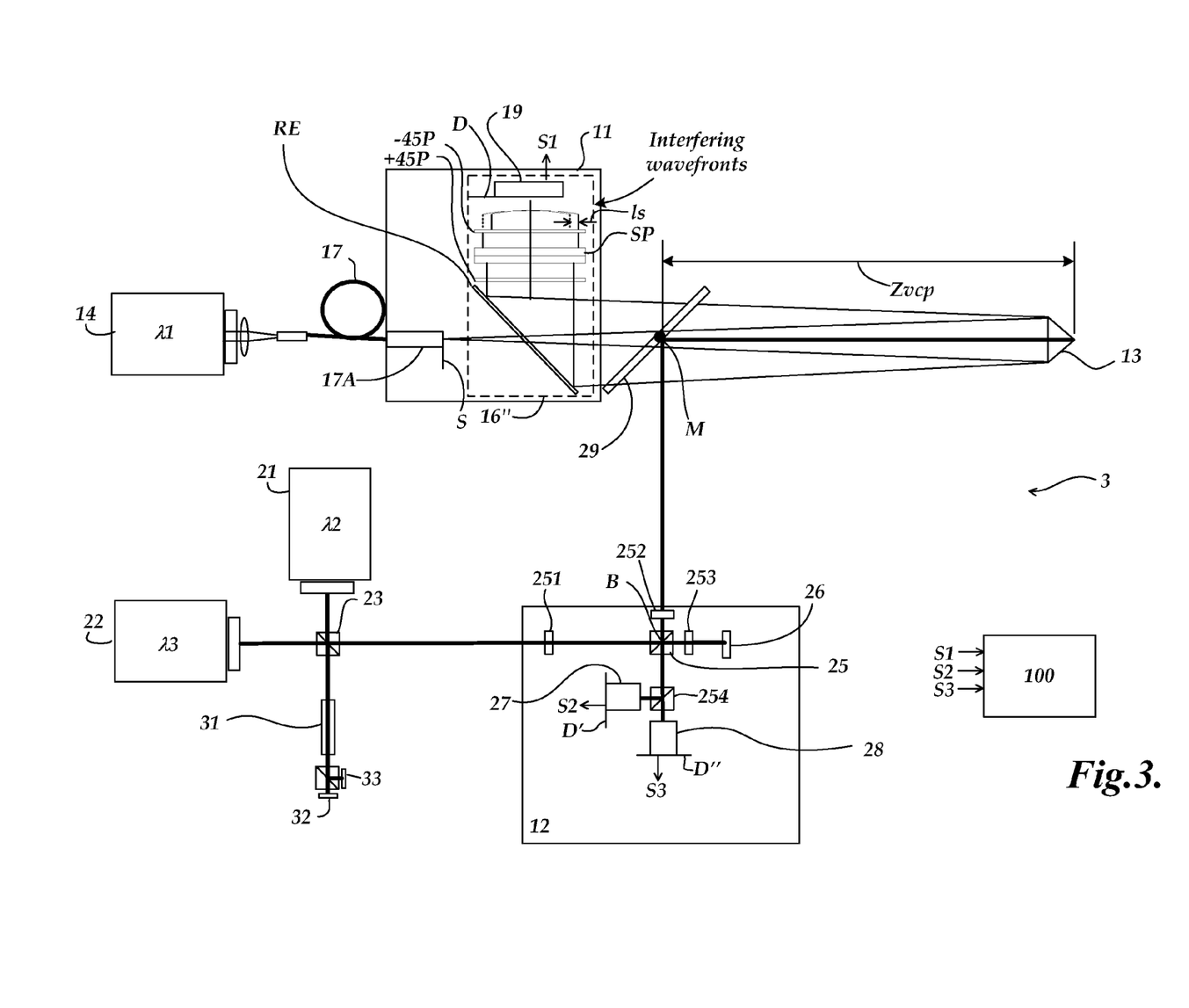
FIG. 3 is a schematic diagram showing a configuration of a fixed wavelength absolute distance interferometer of a third exemplary embodiment.

In the embodiment of the first interferometer 11 shown in FIG. 3, the wavefront radius detector 16" is used in place of the wavefront radius detector 16'. The wavefront radius detector 16" uses a known type of lateral shearing wavefront radius detection and includes a reflective element RE, a first polarizer +45P, a Savart Plate SP, a second polarizer −45P and an imaging array 19, which operate as described further below.

Except for the differences described above, the fixed wavelength absolute distance interferometer 3 may have the same configuration and operation as the fixed wavelength absolute distance interferometer 2 of the second exemplary embodiment.

The function of the fixed wavelength absolute distance interferometer 3 is described below.

The laser beam emitted from the first laser emitter 14 is transmitted through the optical fiber 17 and transmitted toward the retroreflector 13 from a point source aperture 17A at the end of the optical fiber 17. The single wavefront laser beam bypasses the reflecting element 18 and traverses through the dichroic filter 29 toward the retroreflector 13 along the first-interferometer measurement path and is reflected back by the retroreflector 13. The returning first-interferometer light beam is reflected by the reflecting element 18 through the first polarizer +45P to the Savart plate SP. The single wavefront of the returning laser beam is split into two approximately identical wavefronts having approximately identical radii of curvature and an offset ls perpendicular to their direction of propagation, according to known principles of operation of the Savart plate SP. The value of ls is a constant associated with the design of the Savart Plate that may be determined by design or experiment. Then, the two wavefronts are transmitted through the second polarizer −45P such that they interfere, and toward the imaging array 19. The interference fringes formed by the two wavefronts are detected by the imaging array 19. The computer 100 may calculate the pitch of the interference fringes detected by the imaging array 19. The coarse resolution measurement R may be obtained according to the same analysis described in the first exemplary embodiment by the computer connected with the imaging array 19 on the basis of the pitch P of the interference fringes detected by the imaging array 19. In some embodiments, the configuration of the wavefront radius detector 16" and related detection may be approximately as described in the article "Range Sensing Based on Shearing Interferometry", by Haulser et al., in *Applied Optics*, November 1988, for example.

4. Fourth Exemplary Embodiment

A fixed wavelength absolute distance interferometer 4 of a fourth exemplary embodiment is described below.

Figure 4:
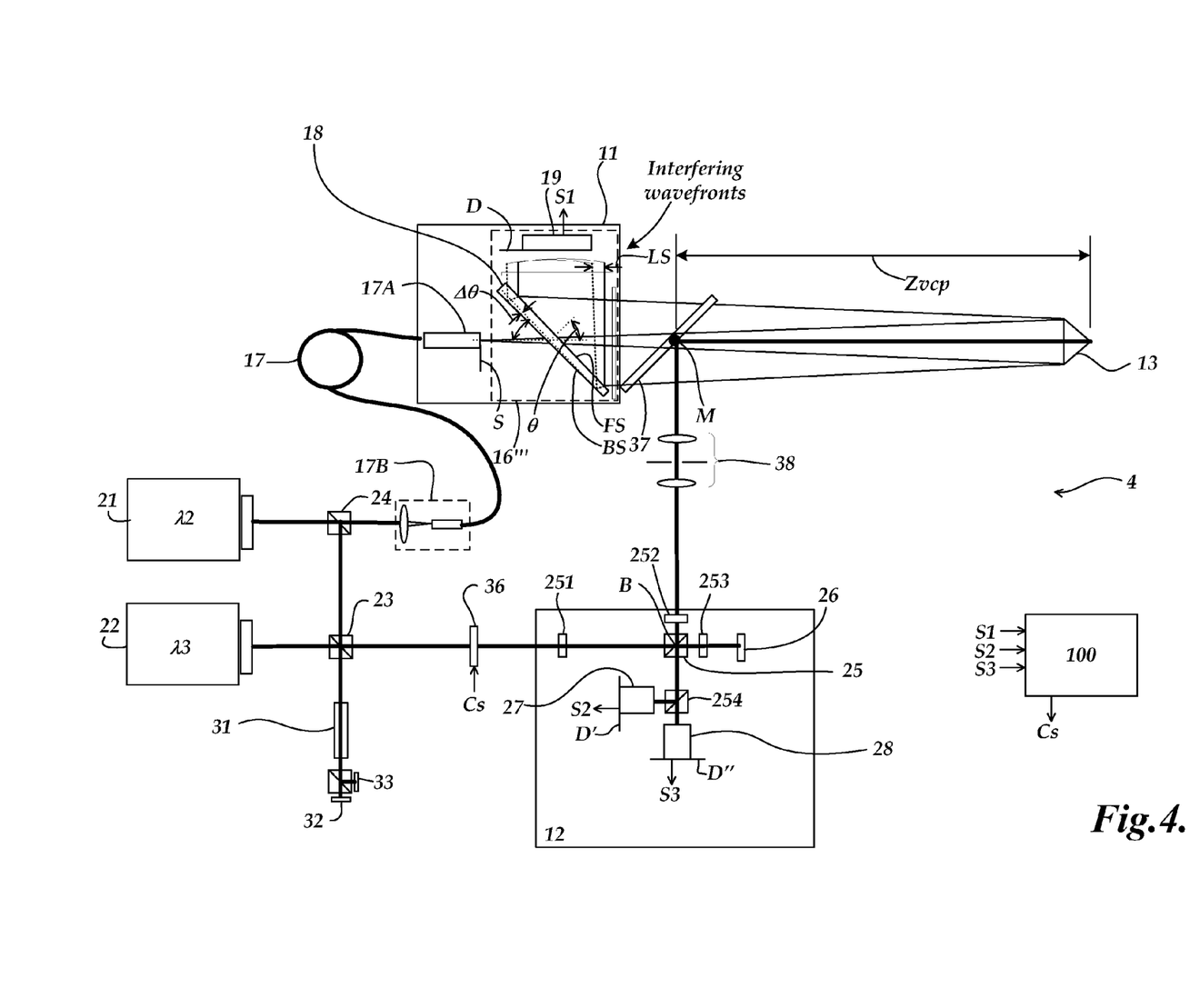
FIG. 4 is a schematic diagram showing a configuration of a fixed wavelength absolute distance interferometer of a fourth exemplary embodiment.

As shown in FIG. 4, the fixed wavelength absolute distance interferometer 4 includes a first interferometer 11 and a second interferometer 12 having the following configurations.

In the embodiment shown in FIG. 4, the fixed wavelength absolute distance interferometer 4 includes a beam splitting device 24 disposed so as to split and transmit a portion of the light from the second laser emitter 21 into the optical fiber 17 to be used for the first interferometer 11, a shutter element 36 disposed to intermittently block the second interferometer light beam, and a conventional beamsplitter 35 (e.g., a half-silvered minor) instead of the dichroic filter 29 used in the first, second, and third exemplary embodiments. A spatial filtering arrangement 38 may also optionally be included. With this configuration, two laser emitters may be used rather than three, as described in greater detail below.

Except for the configurations described above, the fixed wavelength absolute distance interferometer 4 may have the same configuration and approximately the same measurement methods as the fixed wavelength absolute distance interferometer 2 of the second exemplary embodiment.

The function of the fixed wavelength absolute distance interferometer 4 is described below.

The $\lambda 2$ light beam emitted by the second laser emitter 21 enters the beam splitting device 24 and is separated into two portions. One portion of the $\lambda 2$ light beam is introduced into the first interferometer 11 through the inlet port 17B and the optical fiber 17, and transmitted from the point source aperture 17A. Except for the use of the $\lambda 2$ light wavelength instead of the $\lambda 1$ light wavelength, the configuration and operation of the first interferometer 11 may be as previously described with reference to second exemplary embodiment.

The other portion of the $\lambda 2$ light beam and the $\lambda 3$ light beam emitted by the third laser emitter 22 are combined with each other at the beam combining device 23 into the second-interferometer light beam having the synthetic wavelength $\Lambda$, and the second-interferometer light beam is transmitted to the shutter element 36. Except for the use of the shutter 36 to suspend operation of the second interferometer 12 as described further below, and the optional use of the spatial filtering arrangement 38, the configuration and operation of the second interferometer 12 may be the same as in the previously described embodiments.

Because the same wavelength $\lambda 2$ is used in the first interferometer 11 and the second interferometer 12, the shutter element 36 may be used to suspend operation of the second interferometer 12, such that the signal S1 in the first interferometer 11 is not disturbed by $\lambda 2$ light from the second interferometer 12, while the signal S1 is being determined. The computer 100 may output a shutter control signal Cs to close the shutter element 36 at the proper time for this purpose, and then reopen the shutter element 36 to determine the signals S2 and S3. Due to its divergence from its point source, the $\lambda 2$ light from the first interferometer 11 is much less intense than the $\lambda 2$ light in the second interferometer, and therefore the operation of the first interferometer 11 need not be suspended while determining the signal S2 in the second interferometer 12. In addition, in some embodiments, a telecentric spatial filtering arrangement 38 may be used as shown in FIG. 4. As is known for telecentric spatial filtering arrangements such as the spatial filtering arrangement 38, non-collimated or diverging light is substantially blocked by such an arrangement. Therefore, the diverging light from the first interferometer 11 is substantially prevented from reaching the second interferometer 12.

In the fixed wavelength absolute distance interferometer 4, the first laser emitter 14 can be omitted, and thus, the configuration thereof can be simpler in comparison with the fixed wavelength absolute distance interferometer of the second exemplary embodiment.

The foregoing description of the exemplary embodiments of the present invention has been provided for the purpose of illustration and description. It is not intended to be exhaustive or to limit the invention to the precise forms disclosed. For example, although the optical path length differences between the first and second interferometers have been defined in terms of length in the previously disclosed equations, one skilled in the art will appreciate that constant path length differences, other constant factors, and the like, could be encompassed with more generic "offset" constants defined in other mathematically consistent terms such as wavelengths, or phase, or the like, for use with analogous compatible equations, in various other embodiments. Obviously, many modification and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The embodiments of the invention in which an exclusive property or privilege is claimed are defined as follows:

1. A fixed wavelength absolute distance interferometer including:
    a first interferometer comprising:
        a first light source comprising at least a first point source that transmits at least a first light beam having a wavelength W along a first-interferometer measurement optical path toward a measurement target, wherein the first-interferometer measurement optical path includes a variable optical path length portion having a length that varies with a position of the measurement target, and the at least a first light beam has a wavefront radius that varies with distance along the first-interferometer measurement optical path and;
        a wavefront radius detector configured to provide a first measurement responsive to the wavefront radius at the wavefront radius detector, wherein the first measurement is indicative of the first-interferometer measurement optical path length; and
        a first path length calculating portion configured to calculate a coarse resolution absolute path length measurement R of the first-interferometer measurement optical path length on the basis of the first measurement; and
    a second interferometer comprising:
        a beam transmitting device transmitting a second-interferometer light beam that provides a synthetic measurement wavelength $\Lambda$;
        a beam splitting/combining device separating the second-interferometer light beam into a reference beam traversing a fixed optical path and a measurement beam traversing a second-interferometer measurement optical path that includes the variable optical path length portion having the length that varies with a position of the measurement target, and providing a combined beam by combining the reference beam returning from the fixed optical path with the measurement beam reflected from the measurement target and returning along the second-interferometer measurement optical path;
        a second-interferometer detector configured to receive the combined beam and provide signals indicative of a phase $\phi$ associated with the synthetic measurement wavelength $\Lambda$ in the combined beam; and
        a second path length calculating portion configured to determine a medium resolution absolute path length measurement $Z_M$ of the second-interferometer measurement optical path length on the basis of a number of wavelengths $N_\Lambda$, the wavelength $\Lambda$, and the phase $\phi$ of the combined beam indicated by the signals of the second-interferometer detector, wherein:
            the number of wavelengths $N_\Lambda$ is a calculated integer number of complete wavelengths $\Lambda$ included in the second-interferometer measurement optical path length; and
            the number of wavelengths $N_\Lambda$ is calculated based on the coarse resolution absolute path length measurement R and an offset constant that is related to a constant difference $C_{12}$ between the first-interferometer measurement optical path length and the second-interferometer measurement optical path length.

2. The fixed wavelength absolute distance interferometer of claim 1, wherein the wavefront radius detector is configured to detect interference fringe patterns formed by the first light beam and a second light beam having the wavelength W and a wavefront radius similar to that of the first light beam, and that interferes with the first light beam, at least proximate to the wavefront radius detector.

3. The fixed wavelength absolute distance interferometer of claim 2, wherein the wavefront radius detector comprises a lateral shearing arrangement that provides the second light beam from a copy of the first light beam proximate to the wavefront radius detector.

4. The fixed wavelength absolute distance interferometer of claim 3, wherein the lateral shearing arrangement comprises a Savart plate.

5. The fixed wavelength absolute distance interferometer of claim 2, wherein the wavefront radius detector comprises an imaging array.

6. The fixed wavelength absolute distance interferometer of claim 2, wherein in the first path length calculating portion of the first interferometer, the coarse resolution absolute path length measurement R of the measurement optical path is calculated based on a fringe pitch P of the interference fringe pattern detected by the wavefront radius detector, the wavelength W of the first and second light beams, and a separation distance is measured perpendicular to parallel radii of the wavefronts of the first and second light beams.

7. The fixed wavelength absolute distance interferometer of claim 6, wherein the coarse resolution absolute path length measurement R of the measurement optical path is calculated by the following equation (1):

$$R = (c*ls*P)/\lambda 1 \qquad (1)$$

wherein c is a factor that depends on the alignment of the parallel radii relative to a detection plane of the interference fringe pattern.

8. The fixed wavelength absolute distance interferometer of claim 2, wherein the first light source comprises a second point source located proximate to the first point source, and the second point source transmits the second light beam toward the measurement target along the first-interferometer measurement optical path, wherein the second light beam has a wavefront radius that varies with distance along the first-interferometer measurement optical path.

9. The fixed wavelength absolute distance interferometer of claim 8, wherein the first light source comprises:
    a light emitter emitting light having the first wavelength W through the first point source to provide the first light beam; and
    a beam splitting device located proximate to the first point source and partially transmitting and partially reflecting the first light beam such that the partially reflected first light beam provides the second point source that transmits the second light beam.

10. The fixed wavelength absolute distance interferometer of claim 8, wherein the first light source comprises:
   a first optical fiber having an end that provides the first point source;
   a second optical fiber having an end that provides the second point source; and
   a light emitter emitting light having the first wavelength W, wherein the emitted light is coupled into both of the first and second optical fibers.

11. The fixed wavelength absolute distance interferometer of claim 1, wherein:
   the beam transmitting device of the second interferometer includes:
      a second light source transmitting a $\lambda 2$ light beam having a wavelength $\lambda 2$;
      a third light source transmitting a $\lambda 3$ light beam having a wavelength $\lambda 3$ that is different from the wavelength $\lambda 2$; and
      a beam combining device combining the $\lambda 2$ light beam and the $\lambda 3$ light beam into the second-interferometer light beam that provides the synthetic measurement wavelength $\Lambda$ wherein the wavelength $\Lambda$ is given by the equation:

$$\Lambda = \lambda 2 * \lambda 3 / |\lambda 3 - \lambda 2|,$$

the second-interferometer detector includes:
      a $\lambda 2$ detector detecting a phase $\phi 2$ of a measurement beam component relative to a reference beam component of the $\lambda 2$ light beam in the combined beam; and
      a $\lambda 3$ detector detecting a phase $\phi 3$ of a measurement beam component relative to a reference beam component of the $\lambda 3$ light beam in the combined beam, and
   in the second path length calculating portion, the phase $\phi$ associated with the synthetic measurement wavelength $\Lambda$ in the combined beam is obtained based on the phase $\phi 2$ detected by the $\lambda 2$ detector, and the phase $\phi 3$ by the $\lambda 3$ detector, by the following equation (2):

$$\phi = \phi 3 - \phi 2 \qquad (2).$$

12. The fixed wavelength absolute distance interferometer of claim 11, wherein the second path length calculating portion determines the medium resolution absolute path length measurement $Z_M$ by the following equation (3):

$$Z_M = \Lambda[(|\phi|)_{mod 2\pi}/2\pi] + N_\Lambda * \Lambda \qquad (3).$$

13. The fixed wavelength absolute distance interferometer of claim 12, configured according to a configuration that is one of:
   configuration (a) wherein the wavefront radius detector is arranged such that the measurement target moves relative to the wavefront radius detector, and the second path length calculating portion calculates the number of wavelengths $N_\Lambda$ such that it is equivalent to an integral part of a quotient obtained by dividing the quantity $[R - C_{12}]$ by the wavelength $\Lambda$, and
   configuration (b) wherein the wavefront radius detector is arranged such that the measurement target is fixed relative to the wavefront radius detector, and the second path length calculating portion calculates the number of wavelengths $N_\Lambda$ such that it is equivalent to an integral part of a quotient obtained by dividing the quantity $[2R - C_{12}]$ by the wavelength $\Lambda$.

14. The fixed wavelength absolute distance interferometer of claim 11, wherein the second path length calculating portion calculates the medium resolution absolute path length measurement $Z_M$, then calculates a number of wavelengths $N_{\lambda i}$ that is a number of wavelengths $\lambda i$ of the $\lambda i$ light beam (i=2 or 3) in the medium resolution absolute path length measurement $Z_M$, and that is an integral part of a quotient obtained by dividing the medium resolution absolute path length measurement $Z_M$ by the wavelength $\lambda i$, and then calculating a fine resolution absolute path length measurement $Z_F$ on the basis of the obtained number of wavelengths $N_{\lambda i}$ and the phase $\phi i$ of the $\lambda i$ light beam detected by the $\lambda i$ detector.

15. The fixed wavelength absolute distance interferometer of claim 14, wherein the second path length calculating portion determines the fine resolution absolute path length measurement $Z_F$ by the following equation (4):

$$Z_F = \lambda i (|\phi i|_{mod 2\pi}/2\pi) + \lambda i * N_{\lambda i} + Ci_{FM} \; i = 2 \text{ or } 3 \qquad (4)$$

wherein $Ci_{FM}$ is a difference between the path length measured by the measurement $Z_F$ and the path length measured by the measurement $Z_M$, and is constant regardless of the position of the measurement target.

16. The fixed wavelength absolute distance interferometer of claim 1, wherein:
   the beam transmitting device of the second interferometer includes:
      a second light source transmitting a $\lambda 2$ light beam having a wavelength $\lambda 2$,
      a third light source transmitting a $\lambda 3$ light beam having a wavelength $\lambda 3$ that is different from the wavelength $\lambda 2$, and
      a beam combining device combining the $\lambda 2$ light beam and the $\lambda 3$ light beam into the second-interferometer light beam that provides the synthetic measurement wavelength $\Lambda$;
   the fixed wavelength absolute distance interferometer further includes a measurement beam deflecting device; and
   the fixed wavelength absolute distance interferometer is configured such that:
      the measurement beam deflecting device deflects at least some of the light included in one of (a) the at least a first light beam and (b) the measurement beam, such that that light becomes aligned with the variable optical path length portion before it reaches the measurement target, and
      the measurement beam deflecting device transmits at least some of the light included in the other of (a) the at least a first light beam and (b) the measurement beam, such that that light remains aligned with the variable optical path length portion before it reaches the measurement target.

17. The fixed wavelength absolute distance interferometer of claim 16, wherein:
   the wavelength W is different from the wavelengths $\lambda 2$ and $\lambda 3$;
   the measurement beam deflecting device comprises a dichroic filter that transmits light having the wavelength W but reflects light having the wavelengths $\lambda 2$ or $\lambda 3$; and
   the dichroic filter is arranged to reflect the measurement beam such that it becomes aligned with the variable optical path length portion before it reaches the measurement target and after the measurement beam reaches the measurement target and is reflected back along the variable optical path length portion, to reflect the measurement beam such that it is aligned with the beam splitting/combining device.

18. The fixed wavelength absolute distance interferometer of claim 16, wherein:
   the wavelength W is the same as one of the wavelengths $\lambda 2$ and $\lambda 3$; and the fixed wavelength absolute distance interferometer further comprises a shutter arranged and controlled to prevent the measurement beam of the second interferometer from reaching the measurement beam deflecting device during a time period when the wavefront radius detector of the first interferometer is operating.

19. The fixed wavelength absolute distance interferometer of claim 18, configured such that a light emitter that provides the one of the wavelengths $\lambda 2$ and $\lambda 3$ that is the same as W, also provides light to the first light source of the first interferometer.

20. The interferometer measurement system of claim 1, wherein all light beams consist of light emitted from lasers.

* * * * *